July 29, 1958 H. W. HART 2,845,046
WATER SUPPLYING DEVICE FOR POULTRY
Filed Sept. 26, 1955 2 Sheets-Sheet 1
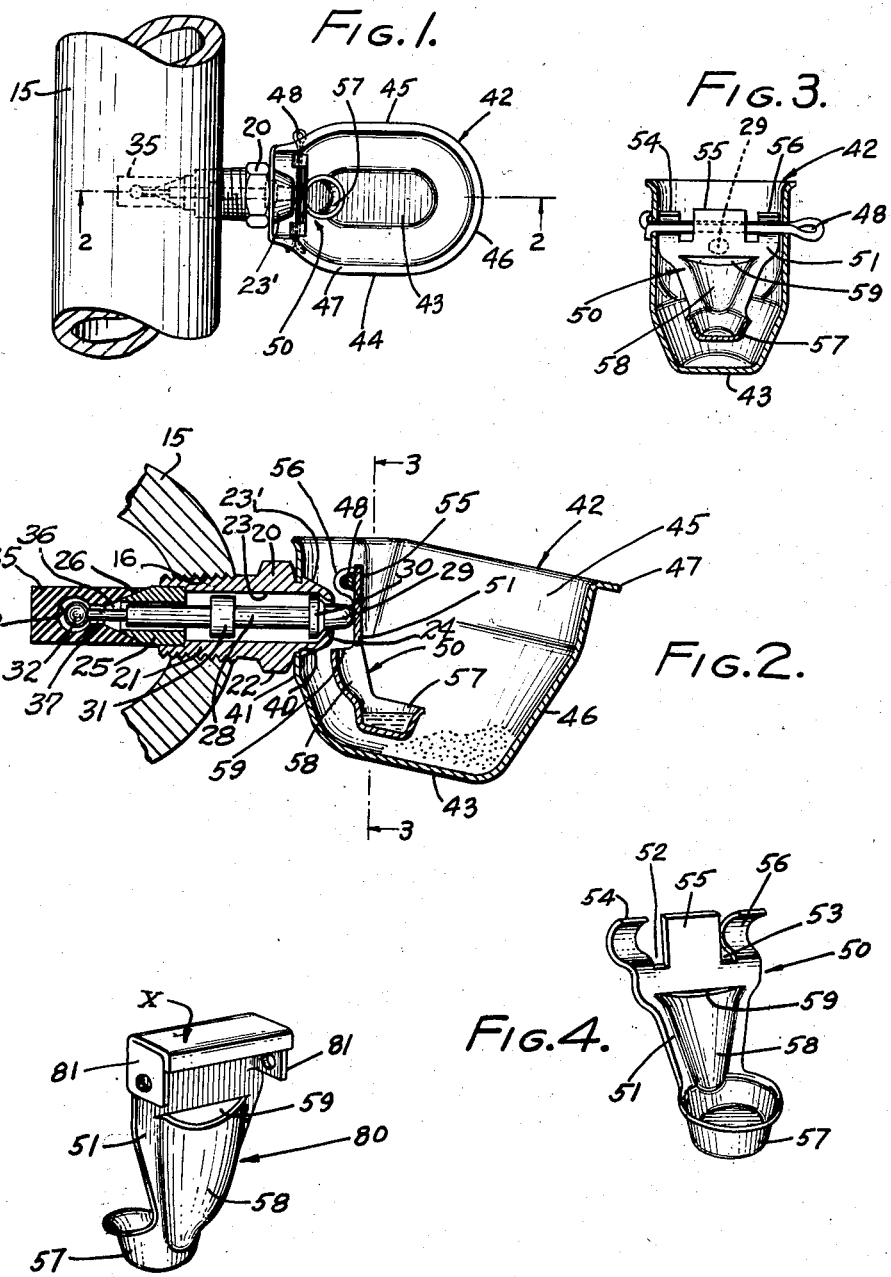
INVENTOR:
HAROLD W. HART

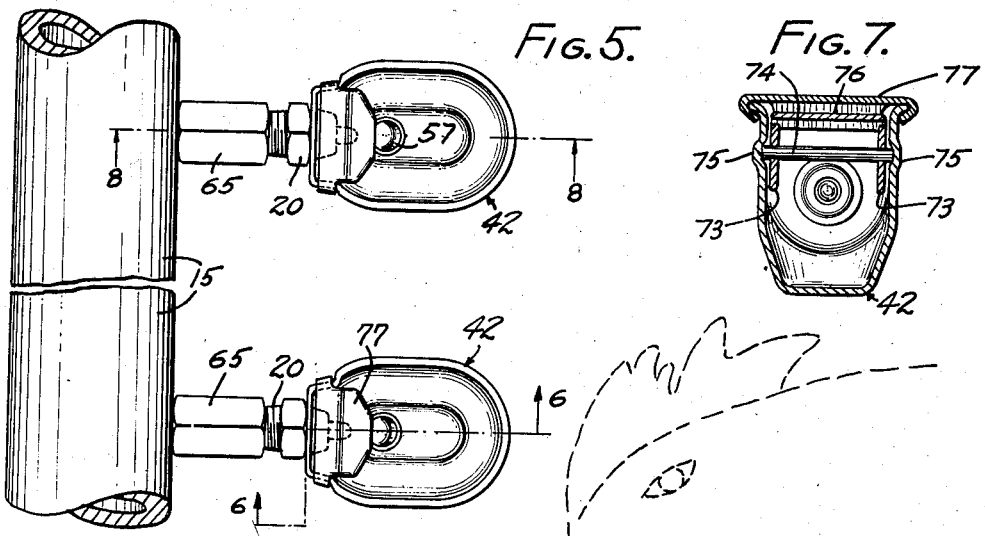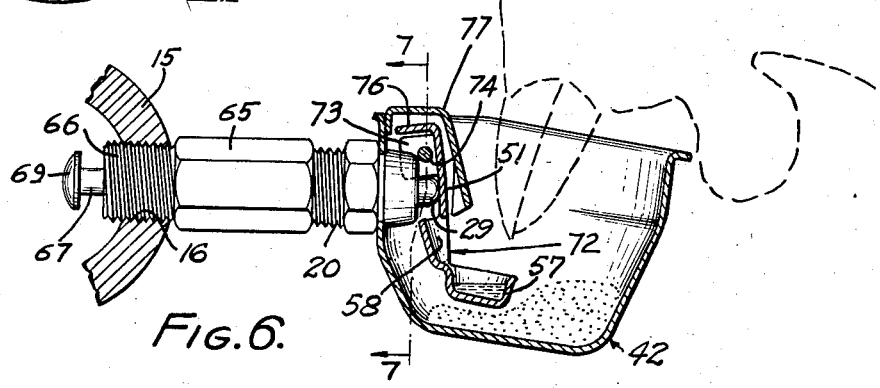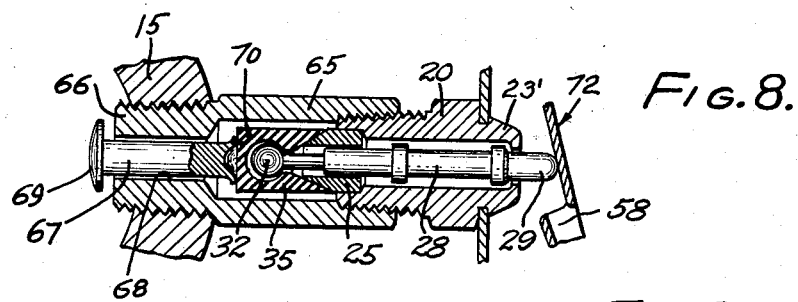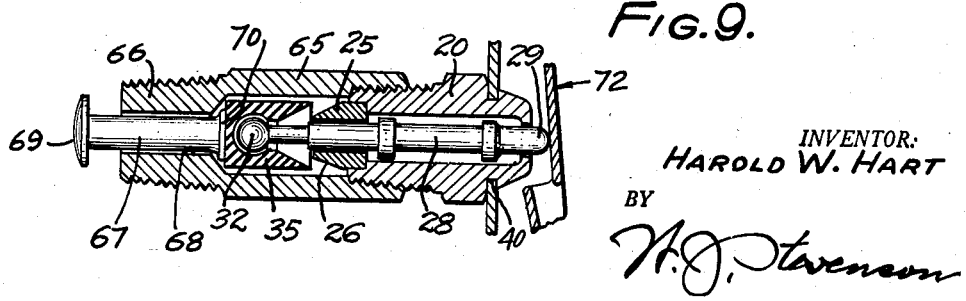

United States Patent Office 2,845,046
Patented July 29, 1958

2,845,046

WATER SUPPLYING DEVICE FOR POULTRY

Harold W. Hart, Glendale, Calif.

Application September 26, 1955, Serial No. 536,339

12 Claims. (Cl. 119—75)

This invention relates generally to liquid dispensing devices and is concerned more particularly with a device for incorporation in a drinking water system for poultry and operative to dispense the drinking water as needed by the poultry.

Valve-type flow controlling devices of various types have been proposed for dispensing drinking water to poultry from a supply line or pipe, the water flowing through the valve device into a suitable receptacle from which it is taken by the poultry. One such valve device is disclosed in my United States Patent No. 2,319,928, issued May 25, 1943, and titled Drinking Cup for Fowl. In that and similar flow-control valves, a plunger constitutes the movable valve element and is arranged to be slid to valve-opening position by the poultry which depress the plunger with their beaks. Manipulation of the plunger in this manner to open the valve allows discharge of water through the valve into a receptacle, such as a pan or cup, where it is available to the poultry for drinking purposes. In many instances, the water is collected in a relatively large receptacle from which several hens or chickens may drink. However, the use of such a large receptacle results in an unsanitary condition for the reason that the fowl may attempt to stand therein or beak contaminating material into the water. The employment of a small cup, such as shown in my patent, referred to above, appears to be the solution to this problem, such a cup being of a size to accommodate the beak of only one chicken or fowl at a time. According to the procedure involved in operating the water dispenser of the patent, the chicken places its beak in the cup and depresses the valve plunger, whereupon the valve is opened to allow discharge of water from the supply pipe into the cup from which it is taken up by the chicken. Since the flow is automatically stopped when the beak is removed from the plunger, it follows that only a small amount of water is made available to the chicken. If more water is needed, the chicken repeats the operation. In this way, substantially all of the dispensed water within the cup is consumed by the fowl so that practically no water is left to become contaminated by foreign matter.

While such prior drinking water dispensing devices have been widely used with a certain degree of success and satisfaction, it has been determined through the years that they are subject to various disadvantages. In the first place, the dispensing valves are suitable for use only in extremely low pressure systems, that is, where the water pressure is negligible. The reason for this is that the valve plunger must be actuated against the pressure acting directly against its inner end. The greater the pressure, the more force of the beak against the plunger is necessary to open the valve. Consequently, in order that the valve be operable by young chickens, an extremely small head of water must be maintained in the gravity-feed water supply system.

Such prior plunger-type drinking valves also have the disadvantage that the movable valve element will not seat tightly and when this condition prevails the water may leak into and overflow from the cup to cause wasting of the water and to result in a damp, unhealthy condition in areas adjacent the cups. Such a deleterious condition may be due to several factors, one of which is that the necessarily low water pressure is insufficient to force the valve element against the valve seat, particularly in the case of a "sticky" valve element. Such "sticking" of the valve element or plunger frequently occurs as the result of food particles or foreign sediment entering the valve body when the plunger is depressed by the beak of the poultry.

A further disadvantage of the prior drinking valve devices resides in the fact that the valves include two moving parts, namely, a rubber valving element normally maintained closed against an annular seat within the valve body, and an axially-aligned valve-actuating plunger accessible to the beak of the fowl. Due to this fact, it is possible for either of these parts to become jambed to result in leakage of the water through the valve.

It is the primary object of the present invention to obviate the deficiencies and disadvantages of prior poultry drinking devices outlined above, by providing a new and improved water dispensing device which is highly practical and efficient in use, one which may be used over long periods of time without servicing, and one which is simple in construction and economical to produce so that it may be sold at a very reasonable price to the poultry raiser.

Another object of the invention is to provide a watering device which is so constructed that it can be used in a water system of higher pressure than heretofore employed. By this provision, the movable valve element is maintained in firm engagement with its seat by reason of the higher pressure so as to effect positive shut-off of the water and thus guard against leakage through the valve. This objective is accomplished by providing actuating means by which the movable valving element can be easily moved against the head of water. According to a feature of the invention, the actuating means consists of an actuating lever or trigger engaging the valve-operating plunger at a point adjacent the lever fulcrum so as to produce a leverage or mechanical advantage which makes for feather-touch ease of operation of the plunger.

Another important object of the invention is to provide a poultry drinking device in which the pivoted actuating lever has a small receptacle at its lower free end capable of containing a small quantity of water. In accordance with the present concept, the trigger lever is provided with a passageway or down-spout through which a portion of the water dispensed from the discharge end of the valve may flow into the small receptacle. By this provision, there is provided, on the trigger lever, a small pool of water which serves as "bait" to induce a chicken to place its beak therein to drink the water, contact of the beak against this free end of the lever causing depression of the plunger and thereby opening of the valve to dispense a larger quantity of water into the drinking cup. If the amount discharged into the cup is insufficient to satisfy the thirst, the chicken will unconsciously open the valve when drinking from the small receptacle. Thus, by this simple expedient, automatic supplying of water to the chicken is effectively produced.

Drinking cups previously used for poultry watering have been constructed with a flat, horizontal bottom. As a result, dry mash washed from the beaks of the poultry during the drinking process may gather on this lower surface and may build up beneath the projecting operating plunger to become inaccessible to the chickens and this may cause an unsanitary condition. It is therefore another object of this invention to provide in a watering device, of the character referred to, a water-receiving cup which has a bottom wall which slopes downwardly toward the front side of the cup where the poultry stands. By this provision, the cup is formed with a depression into which the food particles may be flushed by the water into position to be eaten by the poultry.

Another object of the invention is to provide a poultry drinking device, of the class indicated, in which the flow-control valve includes a valve body adapted to be screwed into a lateral hole in a water supply pipe, a conical valve seat sleeve carried at the inner end of the body, a valve actuator in the nature of a plunger slidable in the body, and a resilient valving element having a concave, conical end engageable against the conical seat, in response to water pressure exerted against its opposite, innermost, flat end. According to the present concept, the inner end of the plunger is in the form of a ball receivable in an axial socket formed in the resilient valving element, this ball-and-socket connection resulting in a floating action of the valving element so that the latter may readily adjust itself to the valve seat. Also, by so positioning the valving element and seat exteriorly of the valve body, within the water supply pipe or manifold, flow of the water in the pipe around the valving surfaces tends to flush away sediment which, if allowed to accumulate, might prevent full closing of the valve.

A further object of the invention is to provide a watering device of the class specified which may embody means for concealing the projecting end of the actuating or trigger plunger or stem so as to shield this end of the valve against food particles or other matter which might tend to clog the valve.

A still further object of the invention is to provide a device of the type indicated in which the valve seat sleeve and valving element may be disposed within the valve body, if desired, in which case the valve is equipped with an inner slidable element having a head at one end exposed to the water pressure, the other end bearing against the inner end of the resilient valving element.

Further objects of the invention will appear from the following description and from the drawings which are intended for the purpose of illustration only, and in which:

Fig. 1 is a plan view of a preferred form of the poultry watering device, showing it applied to use on a water supply pipe;

Fig. 2 is a larger, longitudinal sectional view, taken on line 2—2 of Fig. 1;

Fig. 3 is a cross-sectional view, taken on line 3—3 of Fig. 2;

Fig. 4 is an enlarged perspective view of the valve-actuating lever;

Fig. 5 is a view similar to Fig. 1, showing a watering device of alternative construction;

Fig. 6 is an enlarged side elevational view, shown part-sectional on line 6—6 of Fig. 5;

Fig. 7 is a cross-sectional view, taken on line 7—7 of Fig. 6;

Fig. 8 is an enlarged sectional view through the valve, taken on line 8—8 of Fig. 5, and showing the valve in closed relation;

Fig. 9 is a view similar to Fig. 8 but illustrating the valve open to dispense the drinking water; and Fig. 10 is a perspective view of a valve-actuating lever of further modified form.

Referring first to Figs. 1 to 4 of the drawings, the improved poultry watering device is adapted for connection to a horizontal water supply line or pipe 15. The line 15 is, in effect, a manifold, having a plurality of spaced threaded holes 16 for connecting a number of the devices to the line. The pipe 15 is joined by piping to a water supply tank (not shown) which receives water from a water main or other source, a predetermined level of the water being maintained in the tank by a usual float-actuated valve. As will be apparent, the height of the tank above the line 15 determines the water head or working pressure in the line.

The watering device includes a tubular valve body 20 having a screw threaded end 21 adapted to be screwed into a threaded hole 16 of the pipe 15, the body having a hexagonal portion 22 to facilitate tightening the body in place. Referring to Fig. 2, the valve body 20 has a bore 23 and at its outer end 23′ has an inturned flange or stop 24. Forced into the inner end of the body 20 is a seat sleeve element 25 which has a conical seat end 26 projecting from the inner threaded end of the body.

Slidable in the bore of the valve body 20 is a valve actuator element or stem 28 having a head 29 projecting outwardly through the restricted bore defined by the stop flange 24, the outer extremity of the head being rounded as shown. At the inner end of the head is a peripheral flange or bead 30 adapted to engage the flange 24 and thus prevent withdrawal of the stem from the body. The stem 28 has another flange 31 adapted to engage the seat element 25 to limit inward sliding movement of the stem. The inner extremity of the stem or plunger 28 is provided with a spherical portion or ball 32.

Carried at the inner end 32 of the stem 28 is a resilient valving element 35 which is generally cylindrical in form. At one end, the element 35 has a conical recess 36 corresponding with the conical seat 26 with which it is adapted to engage to close the valve. Communicating with the conical recess is a bore 37 which terminates in a spherical socket 38 of a larger diameter than the ball end 32. By this ball-and-socket means, the resilient valving element 35 is adapted to be snapped onto the ball end 32 of the stem and, since considerable clearance is provided between these parts, the element 35 is, in effect, a floating part adapted to adjust itself on the stem to allow it to engage firmly against the seat 26 in response to water pressure exerted against its inner face so as to positively shut off the flow of water through the valve.

It will be apparent that when the stem 28 is slid inwardly by exerting a slight force against the head 29, the resilient valving element will be shifted away from the valve seat 26 to allow flow of water from the pipe 15 through the valve body, the water entering through the annular clearance space between the surfaces 26 and 36 and thence flowing through the annular clearance spaces between the stem 28 and the bores of the body and seat element 25, the water then discharging from the valve by way of the annular space provided between the head 29 and the flange 24. When force against the head 29 is relieved, the water pressure, acting against the end of the floating valving element 35 forces the latter into sealing engagement with the seat 26 to shut off the flow of water. The annular knife edge of the conical portion 36, being highly flexible, is contracted firmly around the seat by reason of the water pressure acting thereagainst so as to effect a positive seal.

The forward, tapered end of the valve body 20 is provided with a narrow, peripheral recess 40 into which the rim of a hole in the back wall 41 of a sheet metal cup 42 is adapted to snap to connect the cup to the valve body. The cup 42 has a downwardly and forwardly sloping bottom wall 43, upstanding side walls 44 and 45, and a rounded front wall 46, the upper edge of the cup having a flanged rim 47. The rearward portions of the side walls 44, 45 are narrowed toward each other, these portions having aligned holes adjacent their upper ends through which extends a cotter pin 48.

Adapted for pivotal movement on the pin 48 is a valve-actuating lever or trigger 50. This lever is a metal stamping and has a substantially vertical plate portion 51, the upper edge of which is slotted at 52 and 53, thus leaving three tabs 54, 55 and 56. The intermediate tab 55 is left plain while the other tabs 54 and 56 are curled to provide bearing ears, as shown in detail in Fig. 4. At its lower, narrowed end, the sheet metal trigger lever is formed with a small cup-shaped receptacle 57. At a point slightly below the tabs 54, 55, 56, the metal is slit horizontally or transversely and the metal below the slit is deformed rearwardly to provide a channel portion or down spout 58 having an opening 59 at its upper end.

The trigger lever 50 is pivotally mounted on the cotter pin 48 with the curled ears 54, 56 lightly engaging against one side of the pin and the central tab 55 lightly contacting the other side thereof. With the trigger 50 thus pivotally mounted on the pin 48, within the cup 42, its receptacle 57 is located adjacent the bottom of the cut and its plate portion 51 engages against the rounded outer end or head 29 of the stem. It will be observed by reference to Fig. 2 that the opening 59 of the channel 58 is located directly below the discharge end 24 of valve body 20 so that when the valve is opened, water may drip into the channel and thence flow downwardly into the small receptacle 57 to fill the same.

Assuming that the watering device is installed on the water supply pipe 15 as illustrated in Figs. 1 and 2, and that there is a quantity of water present in the receptacle 57 of the trigger lever 50, the water pressure within the pipe 15 is sufficient to force the valving element 35 into sealing engagement with the seat 26 so as to prevent flow of the water through the valve body 20, and to maintain the head 29 of the stem 28 extended as shown in full lines in Fig. 2. The trigger lever 50 is so formed and pivotally arranged that the force exerted by the water-laden lever is insufficient to slide the stem 28 to valve-opening position against the water pressure within the pipe 15.

When a fowl wishes to obtain drinking water, it approaches the cup 42 and inserts its beak thereinto. Upon observing the small quantity of water within the receptacle 57, the fowl inserts its beak into the receptacle to obtain the water. Application of beak force against the lower end of the trigger lever 50 causes inward pivotal movement of the lever and inward sliding movement of the stem or plunger 28. Such depression of the stem withdraws the valving element 35 from the seat 26 to effect flow of water from the pipe 15 into the cup 42. During such dispensing of the water into the cup, the water also flows into the receptacle. Upon noticing the greater quantity of water in the cup, the fowl dips its beak into the cup, thus releasing the trigger 50. The water pressure in the pipe 15, then acting against the valving element 35, closes the valve. If the fowl desires additional water, it will proceed to take water from the receptacle 57 and thus again open the valve to admit more water into the cup. When the fowl leaves the cup, there will be a quantity of water in the receptacle 57 as "bait" for subsequently leading this or another fowl to the valve-operating means.

It is to be noted that the point of application of force against the stem head 29 is close to the fulcrum 48 of the trigger lever 50. Consequently, considerable leverage or mechanical advantage is gained and a slight force applied against the lower free end of the trigger 50 is multiplied at the point of application to force the valve stem inwardly to open the valve. Thus, the device may be used for watering newly-born chicks, as well as full grown fowl, even when a water head of from 8 to 10 feet is present in the system. In previous watering systems, it has been necessary to reduce the water head to about 6 to 8 inches to enable the chicks to open the conventional valves against the water pressure. The present, improved valve and actuating means therefor are extremely sensitive in operation so that only a very light beak force is necessary to open the valve.

Due to the downwardly sloping bottom wall 43 of the cup, any loose feed entering the cup is flushed toward the front portion of the cup where it is accessible for eating by the poultry.

Referring now to Figs. 5 to 9, the modified device shown therein is generally similar to that described above and like parts are indicated by like reference numerals. In this alternative structure, the valve body 20 is provided with an adapter or tubular extension 65 having a female threaded end into which the threaded end of the body is threaded (Fig. 8). The extension 65 has an inner threaded end 66 screwed into a hole in the pipe 15. In this case, the seat element 25 and valving element 35 are located within the extension 65. Also, the modified device has a pressure element 67 slidable loosely in a bore 68 of the extension and provided with a head 69 disposed within the pipe 15 and subjected to the water pressure therein. The forward end of the element 67 is enlarged at 70 to provide for large area engagement of the element against the resilient valving element 35. By this structure, the valving parts are concealed within the body and distortion of the valving element 35 under the water pressure is resisted.

The trigger lever 72 shown in Figs. 5 to 9 has the plate portion 51, receptacle 57 and channel 58. However, the upper end of the lever 72 has rearwardly bent ears 73 which have aligned holes to pivotally mount the lever on a transverse pin 74 whose ends are received in depressions 75 formed in the side walls of the cup 42 (Fig. 7). The upper end of the plate portion 51 is bent rearwardly in a protector flange 76 which overlies the projecting end of the stem 28 to shield the same against foreign matter which may fall into the cup. To further safeguard against such a condition, a sheet metal guard 77 may be clipped across the rearward top portion of the cup as shown best in Fig. 7. Operation of this alternative device is substantially the same as that for the device shown in Figs. 1 to 4.

The valve-actuating lever or trigger 80 shown in Fig. 10 is similar to the lever 50 and like parts thereof are identified by like reference numerals. In this embodiment, the plate portion 51 is extended upwardly and folded rearwardly to engage the hinge ears 81 and to form therewith a shield X overlying the open end 59 of the channel 58 so as to guard against foreign matter falling through the channel into the receptacle 57.

In practice, a plurality of the watering devices are arranged along one or both sides of the water supply pipe which may extend alongside the individual poultry cages or just above the ground or floor where the poultry is housed. The devices are preferably constructed from brass or bronze to avoid rusting which would result in contamination of the water and possible malfunctioning of the moving parts. In such a watering system, various medicaments, vitamins, etc., may be added to the water and, because the improved device is leakproof, wasting of these expensive additives is avoided.

As a particular feature of the present invention, the control valve is adapted for quick servicing. That is to say, when the resilient valving element becomes deteriorated or warped due to continued use over a long period of time, it is only necessary to unscrew the valve from the water supply pipe to expose the valving element. The element is then stripped from the ball end of the stem or plunger and replaced by a new element which is quickly assembled in place by simply snapping it onto the ball end of the plunger.

The watering devices have been herein described as suitable for supplying water to poultry. It will be apparent, however, that such a device may also be used for dispensing drinking water to small animals, such as the fur-bearing varieties, either in the precise form herein illustrated, or with slight modifications.

While the control valve has been described as having its body screwed into a hole in the water supply pipe, in cases where a flexible hose is employed as the supply line, the valve may be clamped against a side of the hose with its inner end extending through a hole cut in the hose.

In accordance with the provisions of the patent statutes, I have herein described the principle of the invention, together with several structural types which I now consider to represent the best embodiments of the watering device. I wish to have it understood, however, that various modifications might be made in the structure and arrangement of the parts without departing from the spirit or scope of the invention, as defined in the appended claims.

I claim as my invention:

1. A poultry watering device for use in a watering system having a water supply pipe having a hole in a side thereof, comprising: a valve body having an inner end held in said hole, said body having an axial bore; an annular seat element carried by said body at said inner end thereof and arranged coaxial therewith, said seat element having a conical seat; a stem loosely slidable in said bore and through said seat element, said stem having a rounded outer end projecting beyond the outer end of the body; and a resilient valving element universally mounted on the inner end of the stem and having an internal conical surface adapted to normally engage against said conical seat to close the valve in response to water pressure in the pipe exerted against the valving element, said universally mounted valving element being self-adjusting on the stem to provide a positive leakproof engagement, said stem and valving element being slidable to a position to disengage said valving element from said seat in response to a light force exerted axially against said rounded outer end of the stem.

2. A poultry watering device for use in a watering system having a water supply pipe having a hole in a side thereof, comprising: a valve body having an inner end held in said hole, said body having an axial bore; an annular seat element carried by said body at said inner end thereof and arranged coaxial therewith, said seat element having a convex conical seat; a stem loosely slidable in said bore and through said seat element, said stem having a rounded outer end projecting beyond the outer end of the body; a resilient valving element, a universal coupling means floatingly mounting the valve element on the inner end of the stem and having an internal concave conical surface adapted to normally engage against said conical seat to close the valve in response to water pressure in the pipe exerted against the valving element, said floating valving element being self-adjusting on the stem to provide a positive leakproof engagement, said stem and valving element being slidable to a position to disengage said valving element from said seat in response to a light force exerted axially against said rounded outer end of the stem.

3. A poultry watering device for use in a watering system having a water supply pipe having a hole in a side thereof, comprising: a valve body having an inner end held in said hole, said body having an axial bore; an annular seat element carried by said body at said inner end thereof and arranged coaxially therewith, said seat element having a convex conical seat; a stem loosely slidable in said bore and through said seat element, said stem having a rounded outer end projecting beyond the outer end of the body; a resilient valving element, a universal coupling means floatingly mounting the valve element on the inner end of the stem and having an internal concave conical surface adapted to normally engage against said conical seat to close the valve in response to water pressure in the pipe exerted against the valving element, said floating valving element being self-adjusting on the stem to provide a positive leakproof engagement, said stem and valving element being slidable to a position to disengage said valving element from said seat in response to a light force exerted axially against said rounded outer end of the stem; and a water cup associated with the forward, outer end of said valve body for receiving water discharged through the same.

4. A device as defined in claim 3 in which said cup has a bottom wall sloping forwardly and downwardly from a point located substantially below said rounded end of said stem.

5. A device as defined in claim 4 in which said cup is carried by said outer end of said valve body.

6. A device as defined in claim 5 in which the outer end of said body is tapered and has a peripheral groove and in which said cup has a rearward wall provided with a hole of a diameter substantially equal to the diameter of said groove, said cup being slidable axially over said tapered end of said body and adapted to snap into said groove with a tight fit.

7. A device as defined in claim 1 in which said stem has an integral ball formed at its inner end, and in which said resilient valving element has a spherical socket disposed coaxial with said concave, conical surface, said ball being receivable in said socket so that said valving element can be readily snapped onto the ball to floatingly connect the element thereto.

8. A poultry watering device for use in a watering system having a water supply pipe having a hole in a side thereof, comprising: a valve body having an inner end held in said hole, said body having an axial bore; an annular seat element carried by said body at said inner end thereof and arranged coaxial therewith, said seat element having a conical seat; a stem loosely slidable in said bore and through said seat element, said stem having a rounded outer end projecting beyond the outer end of the body; a resilient valving element universally and floatingly mounted on the inner end of the stem and having an internal conical surface adapted to normally engage against said conical seat to close the valve in response to water pressure in the pipe exerted against the valving element, said floating valving element being self-adjusting on the stem to provide a positive leakproof engagement, said stem and valving element being slidable to a position to disengage said valving element from said seat in response to a light force exerted axially against said rounded outer end of the stem, a water cup carried by said outer end of said valve body; and a valve-actuating trigger lever pivoted within said cup and engaging said outer rounded end of said stem, pivotal force exerted against said lever serving to slide said stem inwardly to open the valve.

9. A poultry watering device for use in a watering system having a water supply pipe having a hole in a side thereof, comprising: a valve body having an inner end held in said hole, said body having an axial bore; an annular seat element carried by said body at said inner end thereof and arranged coaxial therewith, said seat element having a conical seat; a stem loosely slidable in said bore and through said seat element, said stem having a rounded outer end projecting beyond the outer end of the body; a resilient valving element universally mounted on the inner end of the stem and having an internal conical surface adapted to normally engage against said conical seat to close the valve in response to water pressure in the pipe exerted against the valving element, said universally mounted valving element being self-adjusting on the stem to provide a positive leakproof engagement, said stem and valving element being slidable to a position to disengage said valving element from said seat in response to a light force exerted axially against said rounded outer end of the stem; a water cup carried by said outer end of said valve body; and a valve-actuating trigger lever pivoted within said cup on a pin extending transversely of the cup, said trigger lever engaging said rounded end of said stem at a point adjacent said pivot pin, pivotal force exerted against the free end of the lever serving to slide said stem inwardly to open the valve.

10. A poultry watering device for use in a watering system having a water supply pipe having a hole in a side thereof, comprising: a valve body having an inner end held in said hole, said body having an axial bore;

an annular seat element carried by said body at said inner end thereof and arranged coaxial therewith, said seat element having a conical seat; a stem loosely slidable in said bore and through said seat element, said stem having a rounded outer end projecting beyond the outer end of the body; a resilient valving element universally mounted on the inner end of the stem and having an internal conical surface adapted to normally engage against said conical seat to close the valve in response to water pressure in the pipe exerted against the valving element, said universally mounted valving element being self-adjusting on the stem to provide a positive leakproof engagement, said stem and valving element being slidable to a position to disengage said valving element from said seat in response to a light force exerted axially against said rounded outer end of the stem; a water cup carried by said outer end of said valve body; and a valve-actuating trigger lever pivoted within said cup on a pin extending transversely of the cup, said trigger lever engaging said rounded end of said stem at a point adjacent said pivot pin, pivotal force exerted against the free end of the lever serving to slide said stem inwardly to open the valve, the distance of the point of engagement of the trigger lever against the stem from the pivotal axis of the lever, and the distance of the free end of said lever from said pivotal axis, being of the ratio of at least 1 to 3.

11. A device as defined in claim 10 in which said trigger lever depends from said pivot pin and has a substantially vertical plate portion engageable against said rounded end of said stem, said lever having an integral, relatively small, cup-like water receptacle at its lower free end.

12. A device as defined in claim 11 in which said trigger lever has a channel in its said plate portion, said channel underlying said outer end of said valve body and adapted to direct water discharged therefrom into said water receptacle.

References Cited in the file of this patent

UNITED STATES PATENTS

| | | |
|---|---|---|
| 2,319,928 | Hart | May 25, 1943 |
| 2,486,729 | Beckley | Nov. 1, 1949 |

FOREIGN PATENTS

| | | |
|---|---|---|
| 272,998 | Great Britain | June 23, 1927 |